(12) United States Patent
Veligdan

(10) Patent No.: US 6,317,545 B1
(45) Date of Patent: Nov. 13, 2001

(54) STEPPED INLET OPTICAL PANEL

(76) Inventor: James T. Veligdan, 6 Stephanie La., Manorville, NY (US) 11949

( * ) Notice: Subject to any disclaimer, the term of this patent is extended or adjusted under 35 U.S.C. 154(b) by 0 days.

(21) Appl. No.: 09/388,087

(22) Filed: Sep. 1, 1999

(51) Int. Cl.[7] .............................. G02B 6/04; G02B 6/06
(52) U.S. Cl. ..................... 385/120; 385/116; 385/901; 359/443
(58) Field of Search .................... 385/120, 121, 385/115, 116, 901, 36; 359/459, 443, 460; 353/30, 79

(56) References Cited

U.S. PATENT DOCUMENTS

| | | | |
|---|---|---|---|
| 4,090,104 | * | 5/1978 | Vann et al. ........................ 313/422 |
| 4,671,606 | * | 6/1987 | Yevick .............................. 385/115 |
| 4,786,139 | * | 11/1988 | Sedlmayr .......................... 385/120 |
| 4,929,048 | * | 5/1990 | Cuypers ........................... 385/116 |
| 5,106,181 | * | 4/1992 | Rockwell, III .................... 385/2 |
| 5,381,502 | | 1/1995 | Veligdan .......................... 385/115 |
| 5,587,816 | * | 12/1996 | Gunjima et al. .................. 349/62 |
| 5,625,736 | | 4/1997 | Veligdan .......................... 385/120 |

OTHER PUBLICATIONS

3M, "3M Transmissive Right Angle Film II," Production Literature, 1996, four pages.

* cited by examiner

*Primary Examiner*—Cassandra Spyrou
*Assistant Examiner*—Euncha Cherry
(74) *Attorney, Agent, or Firm*—Reed Smith LLP; William J. McNichol, Jr.; Matthew J. Esserman

(57) ABSTRACT

An optical panel includes stacked optical waveguides having stepped inlet facets collectively defining an inlet face for receiving image light, and having beveled outlet faces collectively defining a display screen for displaying the image light channeled through the waveguides by internal reflection.

19 Claims, 3 Drawing Sheets

STEPPED INLET OPTICAL PANEL

This invention was made with Government support under contract number DE-AC02-98CH10886, awarded by the U.S. Department of Energy. The Government has certain rights in the invention.

BACKGROUND OF THE INVENTION

The present invention relates generally to fiber optics, and, more specifically, to a video display panel.

The present invention is an improvement over U.S. Pat. Nos. 5,381,502 and 5,625,736 by the same inventor.

These patents disclose optical display panels including laminated waveguides defining a wedge having a narrow inlet face along the bottom thereof, and a vertical outlet screen disposed obliquely thereto. The waveguides are inclined at a small acute angle between the inlet face and the screen for transmitting image light with total internal reflection.

The optical panel is extremely thin in depth compared to its height and width and requires suitable projection optics to distribute the image light across the small inlet face for expansion at the screen. The waveguides are preferably ribbons extending the full width of the panel, and are stacked vertically together along the height of the panel for effecting a suitable vertical resolution in the screen corresponding with the same number of stacked waveguides. Horizontal resolution is effected by horizontal modulation of the image light across the inlet face.

In this wedge construction, the waveguides have varying length, with the shortest being at the bottom of the screen and the longest being at the top of the screen. In this way, the individual inlets ends of the several waveguides may be disposed in a common plane at the bottom of the screen to define the narrow inlet face.

Correspondingly, the projector used for spreading the image light across the inlet face requires a suitable lens system or image optics having different focal planes across the width and height of the screen. Furthermore, since the efficiency of light transmission through the waveguides is not perfect, losses in light intensity increase with waveguide length from the bottom to the top of the screen. Such losses may be minimized by using higher quality waveguides, with an attendant increase in cost.

Although the wedge optical display may be made relatively thin, it may be made relatively large in width and height with a corresponding weight. And, the variable length waveguides increase manufacturing complexity and cost, and require a relatively complex and expensive light projector with different focal planes for horizontal and vertical focusing of the image.

Accordingly, it is desired to further reduce the thickness and complexity of an optical panel for reducing weight and cost with enhanced performance.

BRIEF SUMMARY OF THE INVENTION

An optical panel includes stacked optical waveguides having stepped inlet facets collectively defining an inlet face for receiving image light, and having beveled outlet faces collectively defining a display screen for displaying the image light channeled through the waveguides by internal reflection.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
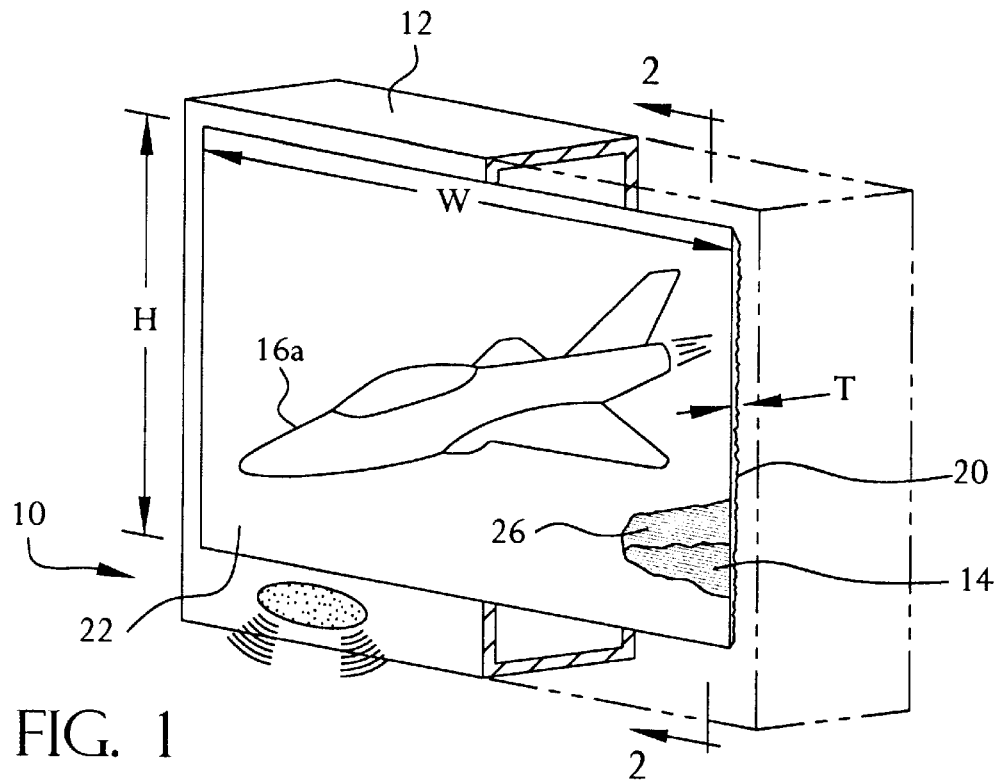
FIG. 1 is an isometric view of a stepped optical display panel in accordance with exemplary embodiment of the present invention.
Figure 2:
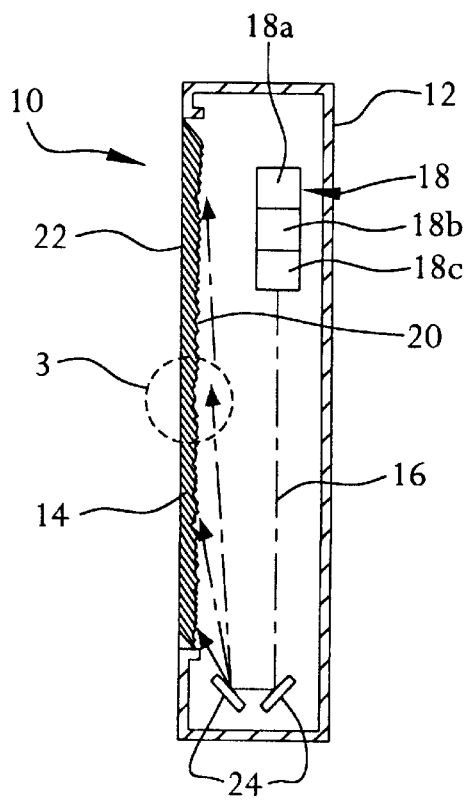
FIG. 2 is an elevational, sectional view through the panel illustrated in FIG. 1 and taken along line 2—2.

Illustrated in FIGS. 1 and 2 is an optical display panel 10 in accordance with an exemplary embodiment of the present invention in the form of a large video display. The panel is mounted vertically in this exemplary embodiment and is suitably supported in a corresponding housing or cabinet 12.

The panel includes a plurality of stacked optical waveguides 14 which receive image light 16 from a suitable light projector 18, and transmit the light therethrough by total internal reflection for display as a video image 16a, for example.

Figure 3:
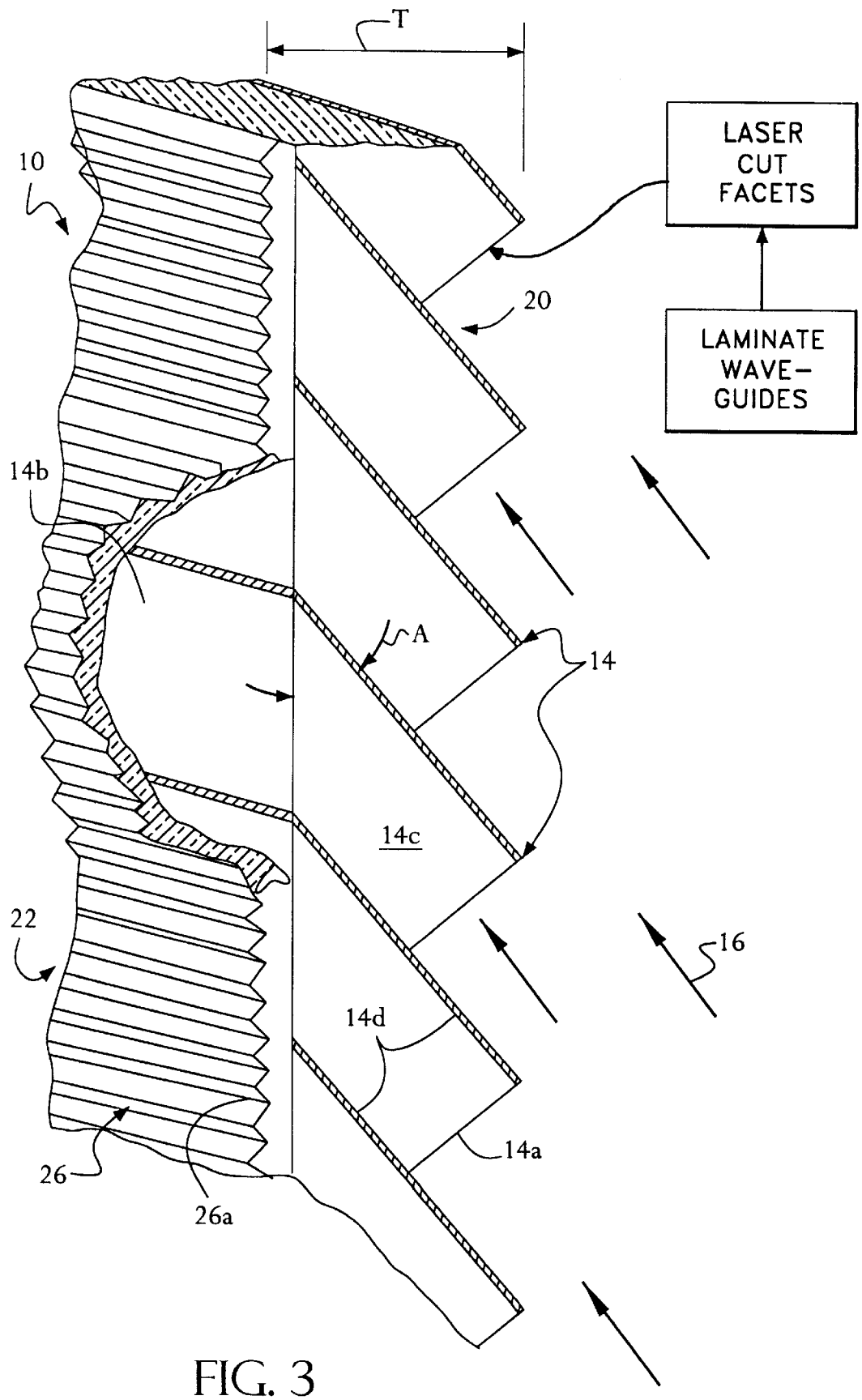
FIG. 3 is an enlarged elevational end view, partly in section, through a portion of the panel illustrated in FIG. 2 within the dashed circle labeled 3.

An enlarged portion of the panel is illustrated in more particularity in FIG. 3. The waveguides have stepped inlet facets 14a at respective back ends thereof collectively defining an inlet face 20 for receiving the image light 16. The waveguides also have beveled outlet faces 14b at respective opposite front ends which collectively define a display screen 22 for displaying the image light channeled through the waveguides by total internal reflection.

Each waveguide 14 includes an optically transmissive core 14c laminated between cladding 14d. The core has a first index of refraction, and may be formed of an optical plastic or glass. The cladding layers 14d have a second index of refraction, lower than that for the cores, for providing substantially total internal reflection of the image light as it is transmitted through the cores. The cladding may be a suitable glass, plastic, or epoxy for example. The cladding is preferably colored black for providing a black screen when not illuminated.

As shown in FIGS. 1 and 3, the waveguides 14 are preferably in the form of thin ribbons or sheets extending continuously along a width W of the optical panel, and are stacked along the vertical span or height H of the panel. The display screen 22 is thusly rectangular in profile with any suitable aspect ratio defined by the width of the waveguides and total collective height thereof. As shown in FIG. 3, the waveguide outlet faces 14b are preferably coplanar to define a substantially flat display screen, or may be arcuate to define a concave or convex screen.

As shown in FIGS. 2 and 3, the waveguides 14 are stacked in a vertical column, and the inlet face 20 and display screen 22 are disposed on opposite sides thereof. The individual waveguides 14 are preferably stacked obliquely in the vertical column at an acute inclination or bevel angle A which may have any suitable value and is preferably less than about 45° for minimizing the collective thickness T of the optical panel between its inlet face 20 and opposite display screen 22.

In the preferred embodiment illustrated in FIG. 3, the inlet facets 14a are configured in a staircase along the height of the column, and are disposed substantially parallel to each other. The inlet facets are also preferably substantially normal or perpendicular to the sidewalls or cladding of the waveguides for maximizing on-axis reception and efficiency of the incident image light 16 transmitted therein from the projector.

Since light travels through each waveguide along its longitudinal axis between the inlet facet and outlet face, maximum efficiency of light reception may be obtained with a normal inlet facet 14a for reducing off axis reflection therefrom. The normal orientation of the inlet facets 14a may be varied a few degrees plus or minus while still efficiently receiving light into the individual waveguides.

To further increase efficiency of light reception into the individual waveguides, the inlet facets 14a are preferably optically polished. Optical polishing may be effected differently for plastic or glass cores 14c. If desired, the inlet faces 14a may have a suitable anti-reflective coating to increase light coupling efficiency.

Illustrated schematically in FIG. 3 is a preferred method of making the optical panel wherein the individual waveguides are formed of thin sheets of glass having a thickness of about 0.05 mm, for example. The glass sheets forming the waveguide cores are preferably laser cut to size, and have corresponding edges which effect optically polished inlet facets 14a due to the laser cutting.

The so cut glass sheets may then be laminated together using a suitable adhesive which forms the cladding 14d, with the several waveguides being configured to define the generally coplanar stepped inlet face 20 and generally coplanar display screen 22.

Although laser cutting of glass is conventional, it has been discovered that laser cutting of the thin glass sheets used for forming the optical display panel inherently effects an optically polished inlet edge. In the view of the stepped inlet face 20, optical polishing thereof is not practical, if possible, with the polishing of the individual waveguides instead being required. The laser cutting of glass sheets to suitable size simultaneously creates the preferred polished inlet facets without the need for additional polishing and cost associated therewith.

The optically polished inlet facets 14a for thin glass cores may be obtained from Erie Scientific Corp., of Portsmouth, N.H., for example, using their laser cutting services.

In the preferred embodiment illustrated in FIG. 3, at least some, and preferably all, of the inlet facets 14a are offset from each other along the waveguides 14 to define the staggered or stepped inlet face 20 which extends generally parallel to the display screen 22 on the opposite side of the panel.

The individual waveguides 14 may be identical to each other and have a common length from inlet facet 14a to outlet face 14b. The thickness T of the panel is thusly controlled by the common length of the waveguides and the bevel and inclination angle A.

In this way, the individual waveguides may be made as short as practical for channeling the image light therethrough, and need not extend to a common inlet face at the bottom of the screen as used in the original wedge optical panels identified in the background section. The stepped-inlet optical panel illustrated in FIG. 3 may therefore have a substantial reduction in thickness as compared to the original wedge optical panel. This substantially reduces weight of the panel, and enjoys additional advantages in conjunction with the projector for reducing complexity while enhancing performance.

In the preferred embodiment illustrated in FIG. 3, the inlet facet 14a of each of the waveguides preferably overlaps vertically along the span or height of the panel only a single outlet face 14b of the next adjacent waveguide. The overall thickness of the panel may thusly be substantially reduced compared to the wedge optical panel.

As shown in FIG. 2, the projector 18, is suitably mounted in the cabinet 12 and is optically aligned with the inlet face 20 for projecting the image light 16 thereacross for transmission through the individual waveguides 14 for display on the screen 22. The projector 18 is illustrated schematically in FIG. 2 and includes, in an exemplary embodiment, a suitable light source 18a for producing the image light 16. The light source may be a light bulb, slide projector, video projector, or laser, for example.

The projector also includes a suitable light modulator 18b for modulating the image light to form the desired light image. The modulator may be a conventional Liquid Crystal Display (LCD) having a matrix of elements which selectively block or reflect, or transmit light for producing a video image.

And, the projector also includes a suitable lens system or image optics 18c for distributing or broadcasting the image light horizontally across the width of the panel and vertically across the height of the panel over the inlet face 20 for transmission through the waveguides to display the image on the screen 22. If desired, folding mirrors 24 may be used inside the cabinet 12 as illustrated in FIG. 2 for redirecting the image light from the projector for effecting a compact assembly with minimum cabinet depth.

A particular advantage of the stepped optical panel illustrated in FIG. 2 is a substantial reduction in complexity of the required image optics 18c for focusing the image horizontally and vertically along the screen. Since the individual waveguides 14 preferably have a common length, with the inlet facets 14a being disposed in a substantially common plane defined by the inlet face 20, the image light may be commonly focused along the inlet face both vertically and horizontally without difference therebetween previously required for the wedge optical panel.

The wedge panel requires two different focal planes for horizontal and vertical focusing, with attendant complexity of image optics. The stepped optical panel enjoys a single focal plane for both the horizontal and vertical focusing, with an attendant reduction in complexity of the image optics 18c. The image optics 18c may also have a variable focal plane over the entire inlet face 20 both horizontally and vertically.

Furthermore, since the waveguides preferably have common lengths, light is channeled therethrough without difference or loss in intensity due to the common length thereof. The waveguide cores 14c may thusly be formed of less expensive optical material irrespective of quality thereof for still achieving a high resolution image with maximum intensity and brightness, and enhanced contrast. The black cladding increases contrast in nonilluminated pixels.

Since the waveguides 14 illustrated in FIG. 3 are inclined relative to the beveled outlet faces 14b thereof, the image light channeled therethrough is emitted along the propagation axis of the waveguides and obliquely to the display screen 22. Although the display screen 22 may be frosted for diffusing the image light thereat, in the preferred embodiment illustrated in FIG. 3, the display screen 22 preferably also includes suitable means adjoining the outlet faces 14b for redirecting image light from the waveguides substantially perpendicularly to the beveled outlet faces 14b.

The turning means may be in the form of a Transmissive Right Angle Film (TRAF) turning film 26 commercially available from the 3M Company of St. Paul, Minn. under the tradename TRAF II. Such a film includes fresnel prismatic grooves 26a as shown in FIG. 3 which turn the image light emitted from the waveguides for emission from the outlet faces 14b substantially perpendicularly thereto for direct reception by an observer facing the display screen 22.

The turning film 26 is relatively thin and may be adhesively bonded to the outlet faces of waveguides. In a preferred embodiment, the waveguides 14, the turning film 26, and its adhesive have the same refractive index. In this way, the image light is efficiently channeled through the waveguides and turned through the film for observation without significant loss in intensity thereof.

Figure 4:
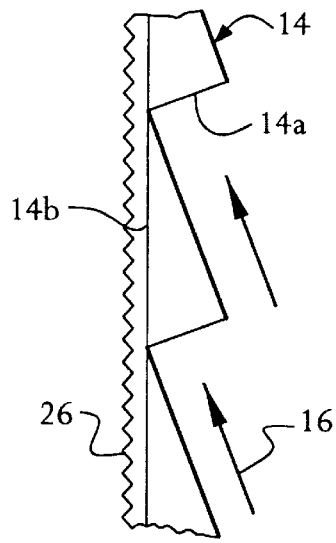
FIG. 4 is an enlarged elevational view of a portion of the optical panel in accordance with other embodiment of the present invention.

FIG. 4 illustrates an alternate embodiment of the optical panel wherein the inlet facet 14a of the each of the waveguides terminates at the outlet face 14b of the next adjacent waveguide without overlap. The waveguides 14 are thusly triangular in section and have minimum thickness. The individual waveguides may be suitably aligned together by being fixedly joined to the common turning film 26 provided at the outlet faces thereof.

Figure 5:
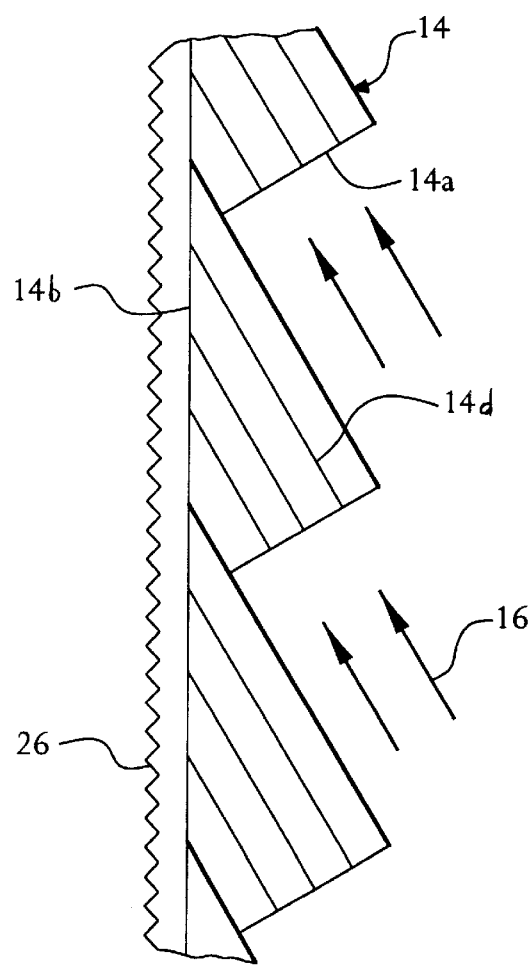
FIG. 5 is an enlarged elevational view through a portion of the optical panel in accordance with another embodiment of the present invention.

FIG. 5 illustrates another embodiment of the optical panel wherein the waveguides 14 are arranged in plural or multiple groups having coplanar inlet facets 14a being stepped from group to group. In the exemplary embodiment illustrated, four waveguides 14 have varying length so that their respective inlet facets 14a are coplanar at one step and offset from the coplanar inlet facets 14a of the next adjacent waveguide group. Although this embodiment requires a larger thickness than the embodiment illustrated in FIGS. 3 and 4, the black cladding 14d in the waveguide groups overlaps for increasing the apparent blackness and contrast observed from the coplanar outlet faces 14b.

The stepped inlet face display panel disclosed above in various embodiments enjoys additional thinness of construction with improved performance. Substantial reduction in overall weight of the optical display and its projector may be obtained. The image optics may be substantially simplified for further reducing weight and cost thereof. And, the stepped inlet facets 14a may be directed downwardly or vertically, or both, in the cabinet for efficient coupling with the cooperating light projector therefor.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. An optical panel comprising a plurality of stacked optical waveguides having stepped inlet facets collectively defining an inlet face for receiving image light, and having beveled outlet faces collectively defining a display screen for displaying said image light channeled through said waveguides by internal reflection, wherein said inlet facets are substantially normal to said waveguides.

2. A panel according to claim 1 wherein said waveguides are stacked in a column, and said inlet face and display screen are disposed on opposite sides thereof.

3. A panel according to claim 2 wherein said waveguides are stacked obliquely in said column.

4. A panel according to claim 3 wherein said inlet facets are configured in a staircase, and disposed substantially parallel to each other.

5. A panel according to claim 4 wherein at least some of said inlet facets are offset from each other along said waveguides.

6. A panel according to claim 4 wherein an inlet facet of one of said waveguides overlaps an outlet face of a next adjacent one of said waveguides.

7. A panel according to claim 4 wherein an inlet facet of one of said waveguides terminates at an outlet face of a next adjacent one of said waveguides.

8. A panel according to claim 4 wherein said waveguides are arranged in plural groups having coplanar inlet facets being stepped therebetween.

9. A panel according to claim 4 wherein said inlet facets are optically polished.

10. A method of making said optical panel according to claim 9 comprising:

laser cutting glass waveguides to effect said polished inlet facets thereof; and laminating together said waveguides to form said inlet face and display screen.

11. A panel according to claim 4 wherein said waveguides have a common length from inlet facet to outlet face.

12. A panel according to claim 4 wherein said display screen further comprises means adjoining said outlet faces for redirecting said image light substantially perpendicular thereto.

13. A panel according to claim 12 wherein said light redirecting means comprise fresnel prismatic grooves.

14. An optical display system comprising a plurality of stacked optical waveguides having stepped inlet facets collectively defining an inlet face for receiving image light, and having beveled outlet faces collectively defining a display screen for displaying said image light channeled through said waveguides by internal reflection, further comprising a projector optically aligned with said inlet face for projecting said image light thereacross for transmission through said waveguides for display on said screen.

15. An optical display system according to claim 14 wherein:

said waveguides have a common length from inlet facet to outlet face; and said projector includes image optics having a single focal plane.

16. A panel according to claim 4 wherein said waveguides comprise ribbons extending continuously along a width of said panel, and stacked along a height of said panel.

17. A panel according to claim 16 wherein each of said waveguides further comprises an optically transmissive core laminated between cladding.

18. A panel according to claim 17 wherein said cladding is black.

19. An optical display system comprising:

a plurality of optical ribbon waveguides stacked obliquely in a column, and having stepped inlet facets collectively defining an inlet face on one side of said column for receiving image light, and having beveled outlet faces collectively defining a display screen on an opposite side of said column for displaying said image light channeled through said waveguides by internal reflection; and a projector optically aligned with said inlet face for projecting said image light thereacross for transmission through said waveguides for display on said screen.

* * * * *